United States Patent
Löhr et al.

(10) Patent No.: US 12,476,697 B2
(45) Date of Patent: Nov. 18, 2025

(54) UPLINK TIMING MAINTENANCE FOR COMMUNICATION PATHS INCLUDING MULTIPLE LEGS INVOLVING A RELAY ENTITY

(71) Applicant: Lenovo (Singapore) Pte. Ltd., New Tech Park (SG)

(72) Inventors: Joachim Löhr, Wiesbaden (DE); Hyung-Nam Choi, Ottobrunn (DE); Prateek Basu Mallick, Langen (DE); Ravi Kuchibhotla, Clarendon Hills, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 392 days.

(21) Appl. No.: 18/033,142

(22) PCT Filed: Oct. 22, 2021

(86) PCT No.: PCT/US2021/056137
§ 371 (c)(1),
(2) Date: Apr. 21, 2023

(87) PCT Pub. No.: WO2022/087330
PCT Pub. Date: Apr. 28, 2022

(65) Prior Publication Data
US 2023/0388007 A1    Nov. 30, 2023

Related U.S. Application Data

(60) Provisional application No. 63/104,453, filed on Oct. 22, 2020.

(51) Int. Cl.
*H04B 7/185* (2006.01)

(52) U.S. Cl.
CPC ..... *H04B 7/18513* (2013.01); *H04B 7/18547* (2013.01)

(58) Field of Classification Search
CPC ............ H04B 7/18513; H04B 7/18547; H04B 7/1853; H04B 7/18543
(Continued)

(56) References Cited

U.S. PATENT DOCUMENTS 9,954,601 B2 *   4/2018   Buer ................... H04B 7/18517
10,439,706 B2 * 10/2019  Michaels ............. H04B 7/2041
(Continued)

FOREIGN PATENT DOCUMENTS

CN      1303182 A   *  7/2001  ............ H04W 52/26
CN    111800851 A   * 10/2020  ........... H04W 56/004
(Continued)

OTHER PUBLICATIONS

PCT International Search Report for PCT/US2021/056137, Joachim Löhr, mailing date—Feb. 11, 2022.
(Continued)

*Primary Examiner* — Mahendra R Patel
(74) *Attorney, Agent, or Firm* — FIG. 1 Patents (57) ABSTRACT

A method and apparatus are provided, in which a service link path delay relative to a first leg of a communication path of a communication between the user equipment and a network entity via a relay entity is estimated (602), where the first leg corresponds to a portion of the communication path between the user equipment and the relay entity. A feeder link path delay relative to a second leg of the communication path is determined (604), where the second leg corresponds to a portion of the communication path between the relay entity and the network entity, based upon at least a received signaling indication. A timing advance value is calculated (606), based upon the service link path
(Continued)

delay and the feeder link path delay. An uplink transmission timing of the user equipment is adjusted (608), based upon the calculated timing advance value.

20 Claims, 7 Drawing Sheets

(58) Field of Classification Search
USPC .......................................................... 455/427
See application file for complete search history.

(56) References Cited

U.S. PATENT DOCUMENTS

| 12,192,938 | B2 * | 1/2025 | Ryu | ..................... H04B 7/0626 |
| 2018/0139082 | A1 * | 5/2018 | Chen | ..................... H04L 5/0007 |
| 2019/0245614 | A1 * | 8/2019 | Lucky | ................. H04B 7/2041 |
| 2021/0321353 | A1 * | 10/2021 | Muruganathan | ..... H04B 7/2125 |

FOREIGN PATENT DOCUMENTS

| CN | 113056877 | A | * | 6/2021 | ......... H04B 7/18519 |
| EP | 3737203 | A1 | * | 11/2020 | ......... H04B 7/18504 |
| WO | WO-9836510 | A1 | * | 8/1998 | ......... H04B 7/18558 |
| WO | WO-0041340 | A1 | * | 7/2000 | ......... H04B 7/18513 |
| WO | WO-2016209332 | A2 | * | 12/2016 | ......... H04B 7/18517 |
| WO | WO-2017124004 | A1 | * | 7/2017 | ........... H04B 7/2041 |

OTHER PUBLICATIONS

3GPP TR 38.821 V16.0.0 (Dec. 2019), 3rd Generation Partnership Project; Technical Specification Group Radio Access Network; Solutions for NR to Support Non-Terrestrial Networks (NTN) (Release 16).

3GPP TS 38.321 V16.2.0 (Sep. 2020), 3rd Generation Partnership Project; Technical Specification Group Radio Access Network; NR; Medium Access Control (MAC) Protocol Specification (Release 16).

3GPP TS 38.214 V16.3.0 (Sep. 2020), 3rd Generation Partnership Project; Technical Specification Group Radio Access Network; NR; Physical Layer Procedures for Data (Release 16).

3GPP TS 38.213 V16.3.0 (Sep. 2020), 3rd Generation Partnership Project; Technical Specification Group Radio Access Network; NR; Physical Layer Procedures for Control (Release 16).

3GPP TS 38.211 V16.3.0 (Sep. 2020), 3rd Generation Partnership Project; Technical Specification Group Radio Access Network; NR; Physical Channels and Modulation (Release 16).

3GPP TS 38.133 V16.5.0 (Sep. 2020), 3rd Generation Partnership Project; Technical Specification Group Radio Access Network; NR; Requirements for Support of Radio Resource Management (Release 16).

3GPP TS 38.331 V16.2.0 (Sep. 2020), 3rd Generation Partnership Project; Technical Specification Group Radio Access Network; NR; Radio Resource Control (RRC) Protocol Specification (Release 16).

* cited by examiner

UPLINK TIMING MAINTENANCE FOR COMMUNICATION PATHS INCLUDING MULTIPLE LEGS INVOLVING A RELAY ENTITY

FIELD OF THE INVENTION

The present disclosure is directed to uplink timing maintenance for communication paths including multiple legs involving a relay entity, such as uplink timing maintenance for non-terrestrial networks including a space based relay station.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In most network environments involving wireless communications, the source of a communication relative to the communication's intended destination is spaced apart geographically. Depending on the distance, which can vary, between the source and the intended destination, the associated transmission delay can also vary. In order to better manage the relative timing that signals from various sources are transmitted and received, a particular base station may send timing advance commands to different ones of multiple User Equipment (UEs) based upon a determined respective associated transmission delay, which can be used to control a particular timing advance relative to each of the potential communication sources.

Historically, a particular delay associated with a communication from a particular UE can be determined by computing a round trip delay. However a round trip delay can become a little more complicated in instances in which a particular communication is not direct, and is relayed through a further communication entity, such as a space based satellite. In such an instance the communication path between the base station and a particular UE can include at least two legs, where the satellite serves as a relay entity. A first one of the two legs, or service link, can involve the portion of the communication path between the UE and the satellite, and the second one of the two legs, or feeder link, can involve the portion of the communication path between the satellite and the base station. Not only do the multiple legs increase the number of communication portions that need to be aggregated in order to determine the overall round trip delay, but the presence of multiple legs can make a determined round trip delay a little more complicated, where multiple legs can require the inclusion of additional significant signaling overhead.

Alternatively, in some instances, an autonomous determination by the UE based upon potential knowledge of the locations of the base station and the relay station may be a possibility. However, the UE may not always know the location of the base station, especially where the UE is not directly communicating with the base station. Correspondingly, an autonomous solution for the overall communication path may not always be possible.

The present inventors have recognized that it would be beneficial if the associated transmission delays associated with each one of multiple legs could be separately determined, and that the overall delay associated with each of the legs of a particular overall communication path could then be used to calculate an appropriate timing advance. This can allow the particular approach to be used in determining the delay for each of the legs of a particular communication to be tailored to the particular circumstances of each one of the related portions (i.e. legs) of the particular communication. In such an instance, a hybrid approach in determining an overall delay becomes possible where the particular approach being applied to each of the legs is different.

SUMMARY

The present application provides a user equipment comprising a transceiver, and a controller. The controller estimates a service link path delay relative to a first leg of a communication path of a communication between the user equipment and a network entity via a relay entity, where the first leg corresponds to a portion of the communication path between the user equipment and the relay entity. A feeder link path relative to a second leg of the communication path is determined, where the second leg corresponds to a portion of the communication path between the relay entity and the network entity, based upon at least a received signaling indication received via the transceiver. A timing advance value is calculated by the controller, based upon the service link path delay and the feeder link path delay. An uplink transmission timing of the user equipment using the transceiver in communicating with the network entity via the relay entity is adjusted by the controller, based upon the calculated timing advance value.

According to another possible embodiment, a method in a user equipment is provided. The method includes estimating a service link path delay relative to a first leg of a communication path of a communication between the user equipment and a network entity via a relay entity, where the first leg corresponds to a portion of the communication path between the user equipment and the relay entity. A feeder link path delay relative to a second leg of the communication path is determined, where the second leg corresponds to a portion of the communication path between the relay entity and the network entity, based upon at least a received signaling indication. A timing advance value is calculated, based upon the service link path delay and the feeder link path delay. An uplink transmission timing of the user equipment in communicating with the network entity via the relay entity is adjusted, based upon the calculated timing advance value.

According to a further possible embodiment, a network entity is provided. The network entity includes a controller that determines a feeder link delay between the network entity and a relay entity, via which the network entity communicates with a user equipment. The network entity further includes a transceiver that communicates to the user equipment, via the relay entity, a signaling indication associated with the determined feeder link delay. An uplink transmission is received from the user equipment, where the timing of the uplink transmission has been advanced, so that when it is received by the network entity, the timing of the uplink transmission more closely corresponds with the timing of any network downlink transmission.

According to a still further possible embodiment, a method in a network entity is provided. The method includes determining a feeder link delay between the network entity and a relay entity, via which the network entity communicates with a user equipment. A signaling indication associated with the determined feeder link delay is communicated to the user equipment, via the relay entity. An uplink transmission is received from the user equipment, where the timing of the uplink transmission has been advanced, so that when it is received by the network entity, the timing of the uplink transmission more closely corresponds with the timing of any network downlink transmission.

These and other features, and advantages of the present application are evident from the following description of one or more preferred embodiments, with reference to the accompanying drawings.

DETAILED DESCRIPTION OF THE PREFERRED EMBODIMENT(S)

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide uplink timing maintenance for communication paths including multiple legs involving a relay entity, such as uplink timing maintenance for non-terrestrial networks including a space based relay station.

Figure 1:
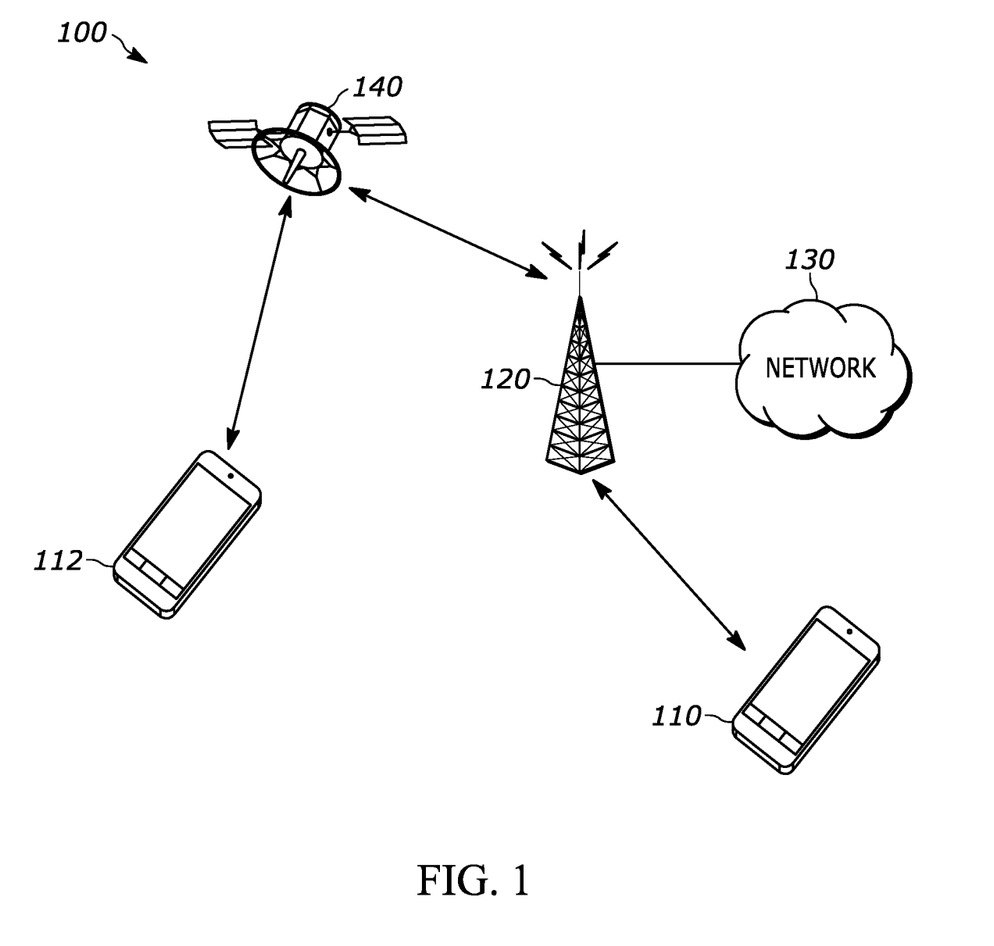
FIG. 1 is a block diagram of an exemplary network environment in which the present invention is adapted to operate.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130, where the wireless communication device 110 can communicate with the network 130 via the base station 120. The system 100 can further include a wireless communication device 112, such as a further UE, that can communicate with the base station 120 via a relay entity 140, such as a non-terrestrial satellite or other intermediate communication entity, terrestrial or non-terrestrial based. The wireless communication devices 110 and/or 112 can be wireless terminals, portable wireless communication devices, smartphones, cellular telephones, flip phones, personal digital assistants, personal computers, selective call receivers, tablet computers, laptop computers, and/or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

A new work item description (WID) has been approved for Rel-17 in radio access network (RAN) #86 meeting on "Solutions for NR to support non-terrestrial networks (NTN)".

Non-terrestrial networks refer to networks, or segments of networks, using an airborne or spaceborne vehicle for transmission:

Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites) Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

The work item aims to specify the enhancements identified for NR NTN (non-terrestrial networks) especially LEO and GEO with implicit compatibility to support HAPS (high altitude platform station) and ATG (air to ground) scenarios according to the following principles:

frequency division duplex (FDD) is assumed for core specification work for NR-NTN.
NOTE: This does not imply that time division duplex (TDD) cannot be used for relevant scenarios e.g. HAPS, ATG Earth fixed Tracking area is assumed with Earth fixed and moving cells UEs with global navigation satellite system (GNSS) capabilities are assumed.

The detailed objectives can be found in RP-193234. Generally speaking, the objectives are to specify enhancing features to Rel-15 & Rel-16's NR radio interface & Next Generation Radio Access Network (NG-RAN) which are among others for example the following:

Enhancing features to address the identified issues due to long propagation delays, large Doppler effects, and moving cells in NTN, the following should be specified (see technical report (TR) 38.821):

Timing relationship enhancements physical layer of the radio interface (RAN1), radio interface architecture and protocols 2 (RAN2)

Enhancements on uplink (UL) time and frequency synchronization [RAN1,RAN2]
hybrid automatic repeat request (HARQ)
Number of HARQ process [RAN1]
Enabling/disabling of HARQ feedback as described in the TR 38.821 [RAN1&2]
In addition, the following topics should be specified if beneficial and needed
Enhancement on the physical random access channel (PRACH) sequence and/or format and extension of the ra-ResponseWindow duration (in the case of UE with GNSS capability but without pre-compensation of timing and frequency offset capabilities) [RAN1/2].
Feeder link switch [RAN2,RAN1]
Beam management and Bandwidth Parts (BWP) operation for NTN with frequency reuse [RAN1/2]
Including signaling of polarization mode
NOTE: offset based solutions for timer adaptations are assumed.
The following user plane procedures enhancements should be specified (see TR 38.821)
medium access control (MAC)
Random access:
Definition of an offset for the start of the ra-ResponseWindow for NTN.
Introduction of an offset for the start of the ra-ContentionResolutionTimer to resolve Random access contention
Solutions for resolving preamble ambiguity and extension of random access response (RAR) window.
Adaptation for Msg-3 scheduling
Only for the case with pre-compensation of timing and frequency offset at UE side
Enhancement on UL scheduling to reduce scheduling latency.
discontinuous reception (DRX):
If HARQ feedback is enabled, introduction of offset for drx-HARQ-RTT-TimerDL and drx-HARQ-RTT-TimerUL.
If HARQ is turned off per HARQ process, adaptions in HARQ procedure
Scheduling Request: Extension of the value range of sr-ProhibitTimer
radio link control (RLC)
Status reporting: Extension of the value range of t-Reassembly
Sequence Numbers: extension of the SN space only for GEO scenarios
packet data convergence protocol (PDCP)
service data unit (SDU) discard: Extension of the value range of discardTimer.
Sequence Numbers: extension of the SN space for GEO scenarios.

Figure 2:
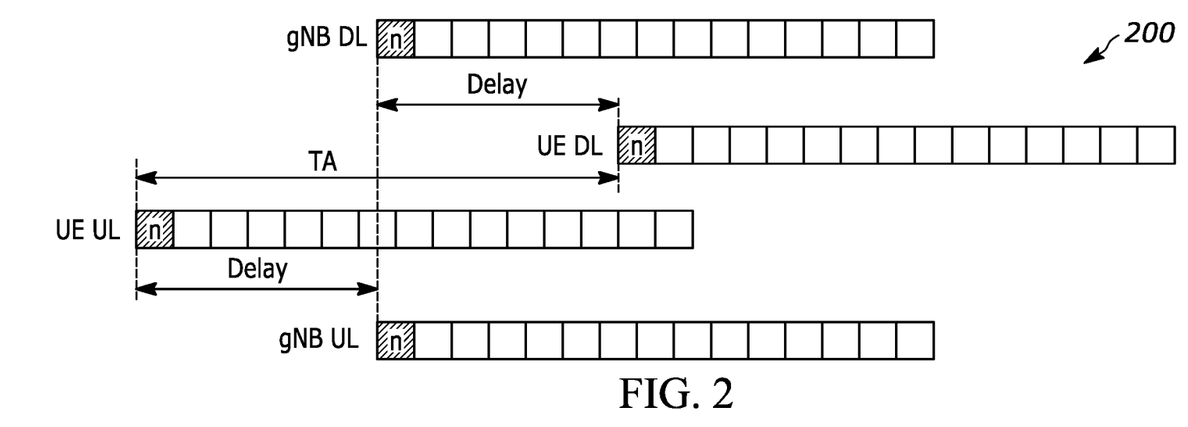
FIG. 2 is an exemplary timing diagram including a timing advance that produces an offset in the downlink and uplink frame timing of the user equipment.
Figure 3:
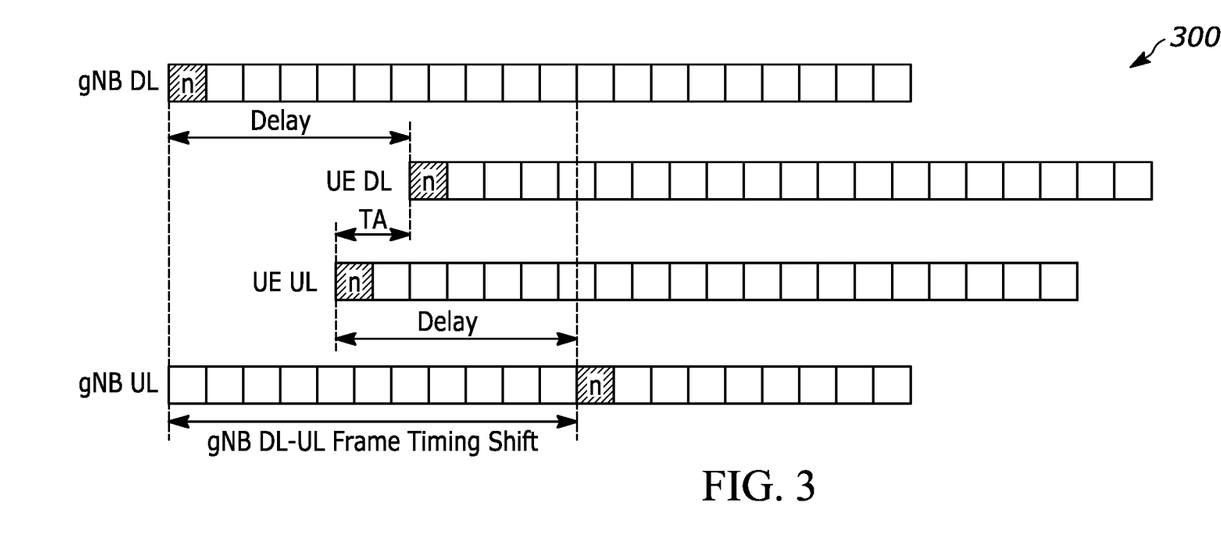
FIG. 3 is an exemplary timing diagram including a timing advance that produces an offset in the downlink and uplink frame timing of the base station serving as a network entity.

In a non-terrestrial network, a UE may need to apply a large timing advance (TA) value that leads to a large offset in its downlink (DL) and UL frame timing. FIG. 2 illustrates an exemplary timing diagram 200 including a timing advance that produces an offset in the downlink and uplink frame timing of the user equipment. FIG. 3 illustrates an exemplary timing diagram 300 including a timing advance that produces an offset in the downlink and uplink frame timing of the base station serving as a network entity. More specifically, FIG. 2 illustrates a scenario, where the UE applies a large TA and gNB's DL and UL frame timing are aligned. Another solution proposed does not need the alignment between gNB's DL and UL frame, illustrated in FIG. 3, where the UE applies a UE specific differential TA and a common TA offset in the gNB's DL and UL frame timing. However, for the solution illustrated in FIG. 3, additional complexity may be needed at network side to manage corresponding scheduling timing for this scenario. Various NR physical layer timing relationships may need to be enhanced to cope with the large offset in the UE's DL and UL frame timing.

FIG. 2 corresponds to an illustration of large TA in NTN that could result in a large offset in the UE's DL and UL frame timing. FIG. 3 corresponds to an illustration of TA in NTN that could result in a large offset in the gNB's DL and UL frame timing.

In NTN there is a long round trip delay (RTD). The delay is comprised of two components: the service link, i.e. between UE and satellite, and the feeder link, i.e. between satellite and base station. As mentioned before, if the UE applies a TA with full RTD, the UL and DL frame timings will be aligned at the gNB side, which is called "full TA" shown in FIG. 2. For UE with GNSS, the RTD of service link can be calculated with its location and satellite ephemeris. Meanwhile, the full RTD of feeder link could be signaled to the UE with the broadcast information by the gNB in the transparent payload architecture.

Figure 4:
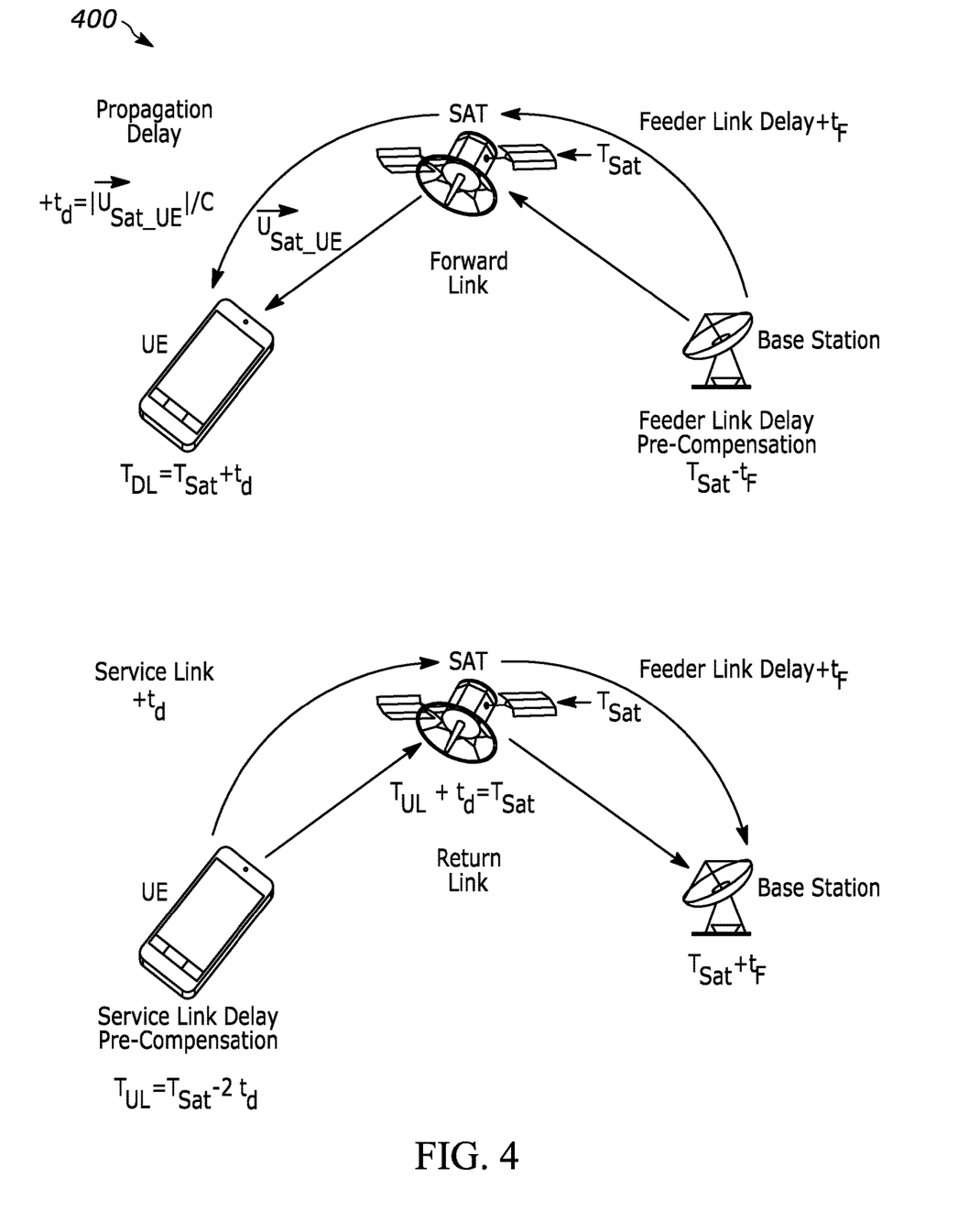
FIG. 4 is a block diagram of exemplary communication paths including multiple legs for each of a forward link and a return link.

FIG. 4 illustrates a block diagram 400 of exemplary communication paths including multiple legs for each of a forward link and a return link.

Figure 5:
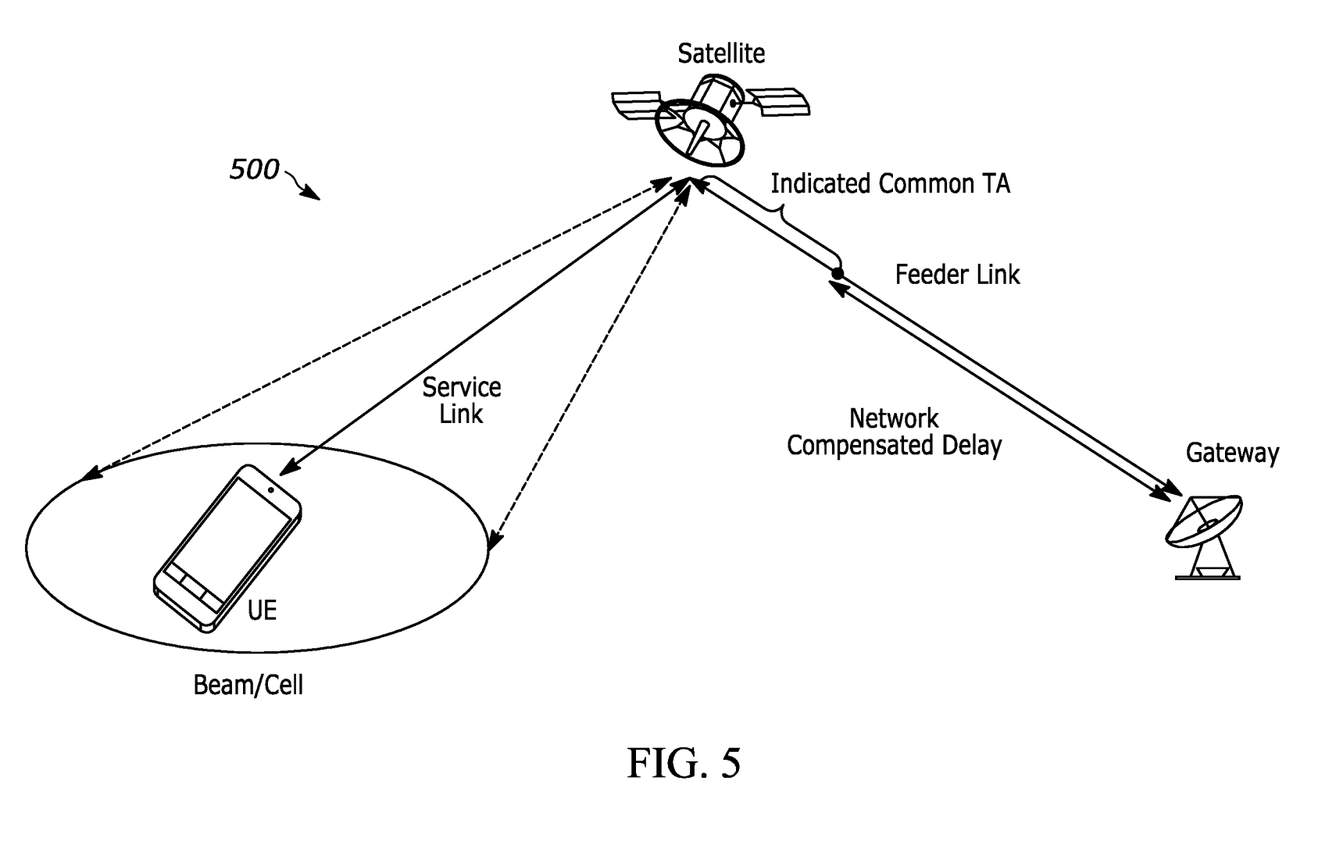
FIG. 5 is a block diagram of a communication path including multiple legs between a user equipment and a network entity via a relay entity including an exemplary timing adjustment.

FIG. 5 illustrates a block diagram 500 of a communication path including multiple legs between a user equipment and a network entity via a relay entity including an exemplary timing adjustment.

In one solution proposed during the Study Item (SI) phase a common TA parameter was introduced, which can be provided by system information block SIB 1. For instance, as illustrated in FIG. 5, if the network compensates part of feeder link propagation delay, the common TA can indicate the rest of the feeder link propagation delay (round trip) to UE. Then, the common TA is added to the calculated service link delay, and UE can get the feasible TA value, which is applied to adjusting the uplink timing.

The present application addresses the following issues regarding enhancements identified for NR NTN (non-terrestrial networks):
Uplink timing maintenance
Uplink scheduling enhancements given the large scheduling delay due to RTD
Excerpts from several existing standards are provided below:
TS38.213
Transmission Timing Adjustments A UE can be provided a value $N_{TA,offset}$ of a timing advance offset for a serving cell by n-TimingAdvanceOffset for the serving cell. If the UE is not provided n-TimingAdvanceoffset for a serving cell, the UE determines a default value $N_{TA,offset}$ of the timing advance offset for the serving cell as described in [10, TS 38.133].

If a UE is configured with two UL carriers for a serving cell, a same timing advance offset value $N_{TA,offset}$ applies to both carriers.

Upon reception of a timing advance command for a timing advance group (TAG), the UE adjusts uplink timing for physical uplink shared channel/sounding reference signal/physical uplink control channel (PUSCH/SRS/PUCCH) transmission on all the serving cells in the TAG based on a value $N_{TA,offset}$ that the UE expects to be same for all the serving cells in the TAG and based on the received timing advance command where the uplink timing for PUSCH/SRS/PUCCH transmissions is the same for all the serving cells in the TAG.

For a band with synchronous contiguous intra-band Evolved-Universal Terrestrial Radio Access NR Dual Connectivity (EN-DC) in a band combination with non-applicable maximum transmit timing difference requirements as described in Note 1 of Table 7.5.3-1 of [10, TS 38.133], if the UE indicates ul-TimingAlignmentEUTRA-NR as 'required' and uplink transmission timing based on timing adjustment indication for a TAG from master cell group (MCG) and a TAG from secondary cell group (SCG) are determined to be different by the UE, the UE adjusts the transmission timing for PUSCH/SRS/PUCCH transmission on all serving cells part of the band with the synchronous contiguous intra-band EN-DC based on timing adjustment indication for a TAG from a serving cell in MCG in the band. The UE is not expected to transmit a PUSCH/SRS/PUCCH in one cell group (CG) when the PUSCH/SRS/PUCCH is overlapping in time, even partially, with random access preamble transmitted in another CG.

For a SCS of $2^\mu \cdot 15$ kHz, the timing advance command for a TAG indicates the change of the uplink timing relative to the current uplink timing for the TAG in multiples of $16 \cdot 64 \cdot T_c/2^\mu$. The start timing of the random access preamble is described in [4, TS 38.211].

In case of random access response, a timing advance command [11, TS 38.321], $T_A$, for a TAG indicates $N_{TA}$ values by index values of $T_A = 0, 1, 2, \ldots, 3846$, where an amount of the time alignment for the TAG with SCS of $2^\mu \cdot 15$ kHz is $N_{TA} = T_A \cdot 16 \cdot 64/2^\mu \cdot N_{TA}$ is defined in [4, TS 38.211] and is relative to the SCS of the first uplink transmission from the UE after the reception of the random access response.

In other cases, a timing advance command [11, TS 38.321], $T_A$, for a TAG indicates adjustment of a current $N_{TA}$ value, $N_{TA\_old}$, to the new $N_{TA}$ value, $N_{TA\_new}$, by index values of $T_A = 0, 1, 2, \ldots, 63$, where for a SCS of $2^\mu \cdot 15$ kHz, $N_{TA\_new} = N_{TA\_old} + (T_A - 31) \cdot 16 \cdot 64/2^\mu$.

If a UE has multiple active UL BWPs, as described in Clause 12, in a same TAG, including UL BWPs in two UL carriers of a serving cell, the timing advance command value is relative to the largest SCS of the multiple active UL BWPs. The applicable $N_{TA\_new}$ value for an UL BWP with lower SCS may be rounded to align with the timing advance granularity for the UL BWP with the lower Sub-Carrier Spacing (SCS) while satisfying the timing advance accuracy requirements in [10, TS38.133].

Adjustment of an $N_{TA}$ value by a positive or a negative amount indicates advancing or delaying the uplink transmission timing for the TAG by a corresponding amount, respectively.

For a timing advance command received on uplink slot n and for a transmission other than a PUSCH scheduled by a RAR UL grant as described in Clause 8.2A or 8.3, or a PUCCH with HARQ-ACK information in response to a successRAR as described in Clause 8.2A, the corresponding adjustment of the uplink transmission timing applies from the beginning of uplink slot n+k+1 where $k = \lceil N_{slot}^{subframe,\mu} \cdot (N_{T,1} + N_{T,2} + N_{TA,max} + 0.5)/T_{sf} \rceil$, is a time duration in msec of $N_1$ symbols corresponding to a PDSCH processing time for UE processing capability 1 when additional PDSCH demodulation-reference signal (DM-RS) is configured, $N_{T,2}$ is a time duration in msec of $N_2$ symbols corresponding to a PUSCH preparation time for UE processing capability 1 [6, TS 38.214], $N_{TA,max}$ is the maximum timing advance value in msec that can be provided by a $T_A$ command field of 12 bits, $N_{slot}^{subframe,\mu}$ is the number of slots per subframe, and $T_{sf}$ is the subframe duration of 1 msec. $N_1$ and $N_2$ are determined with respect to the minimum SCS among the SCSs of all configured UL BWPs for all uplink carriers in the TAG and of all configured DL BWPs for the corresponding downlink carriers. For $\mu = 0$, the UE assumes $N_{1,0} = 14$ [6, TS 38.214]. Slot n and $N_{slot}^{subframe,\mu}$ are determined with respect to the minimum SCS among the SCSs of all configured UL BWPs for all uplink carriers in the TAG. $N_{TA,max}$ is determined with respect to the minimum SCS among the SCSs of all configured UL BWPs for all uplink carriers in the TAG and for all configured initial UL BWPs provided by initialUplinkBWP. The uplink slot n is the last slot among uplink slot(s) overlapping with the slot(s) of PDSCH reception assuming $T_{TA} = 0$, where the PDSCH provides the timing advance command and $T_{TA}$ is defined in [4, TS 38.211].

If a UE changes an active UL BWP between a time of a timing advance command reception and a time of applying a corresponding adjustment for the uplink transmission timing, the UE determines the timing advance command value based on the SCS of the new active UL BWP. If the UE changes an active UL BWP after applying an adjustment for the uplink transmission timing, the UE assumes a same absolute timing advance command value before and after the active UL BWP change.

If the received downlink timing changes and is not compensated or is only partly compensated by the uplink timing adjustment without timing advance command as described in [10, TS 38.133], the UE changes $N_{TA}$ accordingly. If two adjacent slots overlap due to a $T_A$ command, the latter slot is reduced in duration relative to the former slot.

TS38.133

UE Transmitting 7.1.1 Introduction

The UE shall have capability to follow the frame timing change of the reference cell in connected state. The uplink frame transmission takes place $(N_{TA} + N_{TA\_offset}) \times T_c$ before the reception of the first detected path (in time) of the corresponding downlink frame from the reference cell. For serving cell(s) in Primary Timing Advance Group (PTAG), UE shall use the SpCell as the reference cell for deriving the UE transmit timing for cells in the PTAG. For serving cell(s) in Secondary Timing Advance Group (STAG), UE shall use any of the activated SCells as the reference cell for deriving the UE transmit timing for the cells in the STAG. UE initial transmit timing accuracy and gradual timing adjustment requirements are defined in the following requirements.

7.1.2 Requirements

The UE initial transmission timing error shall be less than or equal to $\pm T_e$ where the timing error limit value T e is specified in Table 7.1.2-1. This requirement applies:

when it is the first transmission in a DRX cycle for PUCCH, PUSCH and SRS, or it is the physical random access channel (PRACH) transmission, or it is the msgA transmission.

The UE shall meet the Te requirement for an initial transmission provided that at least one synchronization signal block (SSB) is available at the UE during the last 160 ms. The reference point for the UE initial transmit timing control requirement shall be the downlink timing of the reference cell minus $(N_{TA} + N_{TA\_offset}) \times T_c$. The downlink timing is defined as the time when the first detected path (in time) of the corresponding downlink frame is received from the reference cell. N T A for PRACH is defined as 0.

$(N_{TA} + N_{TA\_offset}) \times T_c$ (in $T_c$ units) for other channels is the difference between UE transmission timing and the downlink timing immediately after when the last timing advance in clause 7.3 was applied. $N_{TA}$ for other channels is not changed until next timing advance is received. The value of $N_{TA\ offset}$ depends on the duplex mode of the cell in which the uplink transmission takes place and the frequency range (FR). $N_{TA\ offset}$ is defined in Table 7.1.2-2.

TABLE 7.1.2-1

$T_e$ Timing Error Limit

| Frequency Range | SCS of SSB signals (kHz) | SCS of uplink signals (kHz) | $T_e$ |
|---|---|---|---|
| 1 | 15 | 15 | $12*64*T_c$ |
|   |    | 30 | $10*64*T_c$ |
|   |    | 60 | $10*64*T_c$ |
|   | 30 | 15 | $8*64*T_c$ |
|   |    | 30 | $8*64*T_c$ |
|   |    | 60 | $7*64*T_c$ |
| 2 | 120 | 60 | $3.5*64*T_c$ |
|   |     | 120 | $3.5*64*T_c$ |
|   | 240 | 60 | $3*64*T_c$ |
|   |     | 120 | $3*64*T_c$ |

Note 1:
$T_c$ is the basic timing unit defined in TS 38.211 [6]

TABLE 7.1.2-2

The Value of $N_{TA\ offset}$

| Frequency range and band of cell used for uplink transmission | $N_{TA\ offset}$ (Unit: $T_C$) |
|---|---|
| FR1 FDD or TDD band with neither E-UTRA-NR nor NB-IoT-NR coexistence case | 25600 (Note 1) |
| FR1 FDD band with E-UTRA-NR and/or NB-IoT-NR coexistence case | 0 (Note 1) |
| FR1 TDD band with E-UTRA-NR and/or NB-IoT-NR coexistence case | 39936 (Note 1) |
| FR2 | 13792 |

(Note 1):
The UE identifies $N_{TA\ offset}$ based on the information n-TimingAdvanceOffset as specified in TS 38.331 [2]. If UE is not provided with the information n-TimingAdvanceOffset, the default value of $N_{TA\ offset}$ is set as 25600 for FR1 band. In case of multiple UL carriers in the same TAG, UE expects that the same value of n-TimingAdvanceOffset is provided for all the UL carriers according to clause 4.2 in TS 38.213 [3] and the value 39936 of $N_{TA\ offset}$ can also be provided for a FDD serving cell.
Note 2:
Void When it is not the first transmission in a DRX cycle or there is no DRX cycle, and when it is the transmission for PUCCH, PUSCH and SRS transmission, the UE shall be capable of changing the transmission timing according to the received downlink frame of the reference cell except when the timing advance in clause 7.3 is applied.

7.1.2.1 Gradual Timing Adjustment

When the transmission timing error between the UE and the reference timing exceeds $\pm T_c$ then the UE is required to adjust its timing to within $\pm T_c$. The reference timing shall be $(N_{TA}+N_{TA\ offset})\times T_c$ before the downlink timing of the reference cell. All adjustments made to the UE uplink timing shall follow these rules:

1) The maximum amount of the magnitude of the timing change in one adjustment shall be $T_q$.

2) The minimum aggregate adjustment rate shall be $T_q$ per second.

3) The maximum aggregate adjustment rate shall be $T_q$ per 200 ms.

where the maximum autonomous time adjustment step T q and the aggregate adjustment rate T p are specified in Table 7.1.2.1-1.

TABLE 7.1.2.1-1

$T_q$ Maximum Autonomous Time Adjustment Step and $T_p$ Minimum Aggregate Adjustment rate

| Frequency Range | SCS of uplink signals (kHz) | $T_q$ | $T_p$ |
|---|---|---|---|
| 1 | 15 | $5.5*64*T_c$ | $5.5*64*T_c$ |
|   | 30 | $5.5*64*T_c$ | $5.5*64*T_c$ |
|   | 60 | $5.5*64*T_c$ | $5.5*64*T_c$ |
| 2 | 60 | $2.5*64*T_c$ | $2.5*64*T_c$ |
|   | 120 | $2.5*64*T_c$ | $2.5*64*T_c$ |

NOTE:
$T_c$ is the basic timing unit defined in TS 38.211 [6]

TS38.821

Following uplink scheduling enhancements are considered for UE operating in a non-terrestrial network

TABLE 1

Scheduling enhancement options

| Scheduling option | | Pros | Cons | Delays* |
|---|---|---|---|---|
| Legacy | SR-BSR procedure | Low resource overhead required | Large delays | At least 2 RTTs of delay |
| Solution 1 | Sending large grant in response to SR | Potentially low resource overhead | Still takes 2 RTTs before UE has the BSR Might be a waste in terms of resources since network is still not aware of the buffer situation of the UE | 1-2 RTTs |
| Solution 2 | Configured grant | Low latency with right configuration | Large overhead Tradeoff between latency and overhead | 0-1 RTT** |

TABLE 1-continued

Scheduling enhancement options

| | Scheduling option | Pros | Cons | Delays* |
|---|---|---|---|---|
| Solution 3 | BSR-indication in SR | Low latency with correct configuration | Large spec-impact Resource overhead impact unclear, larger than SR | 1 RTT |
| Solution 4 | BSR over 2-step random access | Low latency Low overhead | RACH resources required | 0-1 RTT** |

*the number of RTTs before full scheduling based on BSR can begin.
**if configured grant/2-step allocation is large enough and data can be transmitted in the grant.

In an NTN, due to the movement of the satellite, the gNB may have to frequently send $T_A$ commands to the UE if one reuses the current closed-loop $T_A$ adjustment mechanism, which can introduce meaningful signaling overhead. Further the Round-Trip delay (RTD) can be comprised of two components: service link, i.e. between UE and satellite, and the feeder link, i.e. between satellite and base station, whereas the UE may have no direct knowledge on the feeder link delay. Apart from the uplink timing adjustment, also the uplink scheduling procedure can be impacted by the large delay, e.g. legacy scheduling request/buffer status resport (SR/BSR) uplink scheduling procedure can encompass at least 2 round trip time (RTT)s of delay.

Autonomous adjustment of the Timing Advance (TA) before UL transmission by the UE can help avoid the need for frequent $T_A$ update due to satellite time drift, which can reduce signaling overhead in connected mode. The UE autonomous adjustment is compensating the service link delay (UE to satellite), whereas the feeder link delay (satellite to gNB) is controlled by gNB, i.e. TA related signaling information. In at least some embodiments, a new uplink timing alignment procedure is proposed where one component of the Timing advance is autonomously calculated/adjusted by the UE and another component of the TA is controlled/updated by gNB, i.e. similar to closed-loop TA.

Some existing solutions can rely on either only autonomous adjustment by UE or on broadcast parameters such as feeder link delay, feeder link delay drift within SIB. As each UE pre-compensates the service Round Trip Delay on the service link when transmitting on the UL, the different UEs transmissions reach the satellite at the same time. However in order to fully compensate the RTD—total satellite delay is the sum of the access link delay and feeder link delay—such that the UL and DL frame timings will be aligned at the gNB side, the UE may need to apply a further timing advance (component) which is compensating the feeder link delay which is also varying due to the movement of the satellite. At least some of the proposed present embodiments allow a more complete $T_A$ compensation by applying a hybrid scheme where part of the $T_A$ is autonomously adjusted by the UE and another part is controlled by gNB commands. It should be noted that the $T_A$ commands do not need to be sent frequently by gNB since only part of the RTD is compensated by the $T_A$ commands.

The timing advance applied by a UE for its uplink transmission timing is partly calculated/adjusted by the UE autonomously and another component of the TA is updated/adjusted by the network (NW) e.g. by means of Timing Advance (TA) commands. Since the RTD is comprised of two components, i.e. service link and feeder link, the delay needs to be compensated for both links in order to achieve that the DL and UL frame timing is in alignment at gNB. UE autonomously compensates the delay for the service link, whereas the gNB is responsible for the compensation of the feeder link delay e.g. by means of $T_A$ commands.

In accordance with a first embodiment, the timing advance applied by a UE for its uplink transmission timing is partly calculated by the UE autonomously and partly controlled by the NW entity such as a gNB e.g. by means of Timing Advance (TA) commands signaled. Since the Round trip delay (RTD) for NTN (see e.g. FIG. is comprised of two components, i.e. the service link delay and the feeder link delay, the calculation of the timing advance value should consider both links. According to one implementation of this embodiment, UE autonomously compensates the delay for the service link, whereas the gNB is responsible for the compensation of the feeder link delay e.g. by means of $T_A$ commands. It should be noted that the existing $T_A$ mechanism already allows for configuring a common $T_{A\ offset}$ by $N_{TA,offset}$ to some extent (with very limited choices), as shown in the background section in the TA equation ($N_{TA}$+$N_{TA,offset}$)×$T_c$. An additional offset/term, which is in the following referred to as $N_{TA,offset,feeder}$, is according to one implementation added to this equation for NTN while not impacting the usage of $N_{TA,offset}$ in existing specification. The UE in a NTN can autonomously calculate $N_{TA}$ based on the service link delay, for which the serving satellite is the reference point, i.e. the autonomous timing advance calculation (pre-compensation) at UE should only be applicable to $N_{TA}$. The network can configure and control a different $N_{TA,offset,feeder}$ to cope with delay variation caused by other aspects such as delay variation in feeder link, but this is up to network to decide what the network would like to take into account when (re-)configuring $N_{TA,offset,feeder}$.

UE autonomous TA update (pre-compensation) is generally applicable to $N_{TA}$, while the new offset component $N_{TA,offset,feeder}$ should be under network control, i.e., UE does not autonomously update the offset component.

According to one implementation of the embodiment a new formula for timing advance is introduced for non-terrestrial networks:

$$(N_{TA}N_{TA,offset}+N_{TA,offset,feeder})\times T_c$$

$N_{TA}$ is the part of the timing advance which is autonomously calculated by the UE, e.g. based on satellite position and UE position, and maintained by the UE, whereas the new parameter $N_{TA,offset,feeder}$ is the part of the timing advance which is controlled by the gNB. According to one aspect of the embodiment $N_{TA,offset,feeder}$ is updated by signaling commands from the gNB. For example timing advance commands signaled within a medium access control (MAC) control element may be used in order to update the value of $N_{TA,offset,feeder}$. One exemplary implementation for the update of $N_{TA,offset,feeder}$ is given just below. $T_A$ in the equation is the TA command signaled by gNB. gNB may update $N_{TA,offset,feeder}$ for the feeder link, since the satellite is moving.

$$N_{TA,offset,feeder\_new} = N_{TA,offset,feeder\_old} + (T_A - 31) \cdot 16 \cdot 64 / 2^\mu$$

According to another aspect of the embodiment, a timer is associated with the part of the timing advance, which is autonomously calculated by the NTN UE, i.e. $N_{TA}$ in the equation above. At least one aspect of the timer is to control how often UE updates/calculates $N_{TA}$. In order to reduce power consumption, in some instances, the UE may not be required to calculate the service link delay and calculate $N_{TA}$, too frequently. According to one implementation, the UE starts the timer upon having calculated $N_{TA}$ based on GNSS position. As long as the timer is running, the UE uses the last calculated value of $N_{TA}$ for its uplink transmission timing. Upon expiry of the timer, the $N_{TA}$ value is no longer deemed sufficiently accurate, e.g. due to movement of satellite or NTN UE, and UE determines/calculates a new $N_{TA}$ value based on satellite position and UE position.

As mentioned above the gNB may update the part of the timing advance which is related to the feeder link delay, e.g. by means of timing advance commands (MAC CE).

According to one further implementation of the embodiment, a second timer is used which is associated with $N_{TA,offset,feeder}$. Whenever NTN UE receives a TA command from gNB updating to the current $N_{TA,offset,feeder}$ value, e.g. relative update may be indicated by the TA command, the UE starts the second timer. As long as the timer is running UE applies the current value of $N_{TA,offset,feeder}$ for adjusting its uplink transmission timing. Upon expiry of the second timer, UE may trigger a random access procedure similar to the legacy behavior for cases when timeAlignmentTimer expires. According to one specific implementation, the UE uses the $N_{TA,offset,feeder}$ value which is broadcast in the system information for transmission of the PRACH preamble. Alternatively, the UE uses the current timing advance for the transmission of the PRACH preamble. As an alternative implementation, the UE may upon expiry of the second timer not trigger a random access procedure but rather may read the system information for acquisition of the $N_{TA,offset,feeder}$ value. In that sense, the second timer is used to control how often UE reads the system information in order acquire the value of $N_{TA,offset,feeder}$. It may be possible to control the uplink timing without the second timer associated with the feeder link. A timer controls when the UE re-calculates the $N_{TA}$ value, e.g. pre-compensation of the service link delay, is used. The gNB takes care of compensating the feeder link delay by providing updates of $N_{TA,offset,feeder}$, e.g. TA commands. No random access procedure would be triggered by UE autonomously for the purpose of uplink timing alignment. gNB may still have the possibility to trigger a random access procedure by means of a PDCCH order if it's assumed to be necessary.

In accordance with a second embodiment, a timing advance command can update either the $T_A$ component related to the feeder link, e.g. $N_{TA,offset,feeder}$, or the TA component related to the service link, e.g. $N_{TA}$. According to one implementation the timing advance command may be signaled within a MAC control element. One field of the timing advance command can indicate according to one implementation whether the signaled value is to be applied for updating $N_{TA}$ or for $N_{TA,offset,feeder}$. Having such a flexible signaling allows the gNB to update either the service link delay component or the feeder link delay component depending on which of the two is necessary for aligning the uplink and downlink timing at the gNB side.

According to one implementation of the embodiment, the timing advance command indicates whether the UE shall perform autonomous calculation/compensation of the service link delay, e.g. $N_{TA}$. One field, e.g. one-bit flag, in the timing advance command may be used in order to activate or deactivate the UE autonomous pre-compensation functionality.

According to another embodiment, the gNB can provide a UE, e.g. NTN UE, a timing advance update value (relative value) which UE can apply with a given configured periodicity. Assuming that gNB can predict the movement/position of the satellite with a sufficient accuracy, it may be possible to keep the UE uplink timing aligned by configuring the UE, so that it updates its uplink timing advance, e.g. $N_{TA,offset,feeder}$, periodically with a predefined/signaled value. The periodicity and the timing advance update is determined based on the predicted movement, e.g. based on ephemeris information, of the satellite. Such periodic timing advance updating in the UE can avoid the need for frequent $T_A$ command signaling by the gNB.

According to another embodiment, a UE operating in a non-terrestrial network (NTN) can provide only virtual power headroom report (PHR) information to the gNB for a serving cell/carrier, even though the UE may have an uplink resource in the slot for which power headroom is calculated. The assumption is that for the communication from UE to the satellite a Line of sight (LOS) channel scenario is surmised most of the time such that it is sufficient to provide path loss information to the gNB rather than providing accurate power headroom information. Based on Path loss information, the gNB may schedule the UE's uplink transmissions and correspondingly the uplink transmission power. It should be noted that due to the large round-trip time (delay), the aging of power headroom information may lead to some performance loss.

According to a further embodiment, a new logical channel restriction may be introduced for NTN UEs such, that an uplink configured grant configuration may be only used by certain MAC control element(s). According to one implementation of this embodiment a MAC CE, e.g. BSR MAC CE, may be associated with a CG configuration. Such association indicates that the MAC CE is allowed to be transmitted on the corresponding uplink CG resources. The configuration may be signaled by higher layer signaling, e.g. RRC signaling. According to current specifications there is no restriction for MAC CEs, i.e. the MAC CEs can be transmitted on every uplink resources (including configured grant resources). However for a non-terrestrial network it may be beneficial to configure uplink resources semi-statically which are just used for the purpose of BSR reporting. Due to the large delays between the UE and the gNB, the delay for the legacy scheduling procedure, i.e. SR followed by BSR, might not be acceptable. Therefore, it may be considered to assign exclusively CG resources to NTN UEs which are used for the reporting of buffer status information. This could avoid the need to first send a SR in order to request uplink resources for transmitting the BSR MAC CE and hence could significantly reduce the uplink scheduling delay.

According to one implementation of the embodiment, UE shall not trigger SR in response to having a BSR triggered for cases that the UE has been assigned configured grant uplink resource which are associated with the BSR MAC CE. Even though, the configured uplink resource may not be immediately available to the UE once a BSR has been triggered, e.g. next configured uplink grant for BSR reporting is in a few milliseconds, the UE shall not trigger SR. Basically, the SR triggering can be prohibited for the case that the UE has been assigned with configured uplink resources for transmission of BSR MAC CE.

According to a further aspect of the embodiment, the UE multiplexes the UE identity within the uplink resources assigned for the reporting of buffer status. In one implementation UE multiplexes the cell radio network temporary identifier (C-RNTI) MAC CE (together with the BSR MAC CE) within the transport block (TB) transmitted on the configured uplink resources assigned for the purpose of buffer status reporting. For cases when the uplink resources are assigned to multiple UEs, overbooking can be used in order to reduce the resource usage. It may be required for the gNB to know which UE it received buffer status information for. In an alternative implementation, the UE identity may be multiplexed on the PUSCH resources, e.g. rate-matching on PHY layer is used in order to multiplex the identity on the PUSCH.

According to a further embodiment, the UE can indicate to the gNB whether the allocated uplink resources are sufficient or whether more resources are required. Rather than providing detailed buffer status information, which are already outdated when being received at the gNB, the UE may according to this embodiment only provide very coarse buffer status information to the gNB. In one implementation the UE may indicate when no more uplink resources are required, e.g. at the end of a data burst. Such coarse buffer status information may be transmitted on the PUCCH rather than on PUSCH (BSR MAC CE) in order to reduce the uplink scheduling delay. Basically, SR may in one implementation carry more information than just an indication that uplink resources are required. For example, the SR may signal whether the UE is satisfied with the current uplink resource allocated or not. Certain criteria can be defined on when to trigger the SR and indicate whether the UE requires more uplink resources or is satisfied with the current uplink resources. In one implementation, the UE is considered as satisfied whether it can empty its buffers within a certain predefined/configured time period using the current allocated uplink resources. In case it cannot empty its buffer within a given time period given the current allocated grants, it considers itself as unsatisfied and triggers a SR requesting the gNB to increase the allocated resources. Due to the large delays, the gNB may use configured uplink grants rather than dynamic uplink scheduling. Therefore, gNB may in response to receiving an "unsatisfied" indication from the UE, allocate more configured uplink grant resources to the UE, i.e. re-activation of configured uplink grant with larger RB allocation.

Correspondingly, in at least some instances:
1. a new formula for timing advance can be introduced for NTN UEs
   a. $(N_{TA}+N_{TA,offset}+N_{TA,offset,feeder}) \times T_c$
      i. $N_{TA}$ is autonomously calculated/updated by UE, whereas new parameter $N_{TA,offset,feeder}$ is controlled by gNB, i.e. updated by commands from gNB
   b. the UE updates $N_{TA}$ autonomously
      i. a new timer is used for $N_{TA}$, i.e. indicating how often UE has to update the service link RTD
         1. A GNSS position acquired by an NR NTN UE should be associated with a timer, after which expiration the position is deemed no longer useful.
   c. gNB updates $N_{TA,offset,feeder}$ by means of TAC (MAC CE), e.g. granularity of TAC is different to TAC for $N_{TA}$
      i. the second timer may be used similar to TAT in Rel-15
         1. upon expiry of the timer, the UE may need to read SIB for getting $N_{TA,offset}$ (common offset)
2. the timing advance command can indicate whether the signaled value should be applied to $N_{TA}$ or $N_{TA,offset,feeder}$
   a. the timing advance command can indicate whether UE shall perform autonomous pre-compensation
3. the UE can apply the signaled timing advance command value at a preconfigured periodicity
4. an LCH restriction for MAC CE can be introduced
   a. the configured uplink grant configuration can be associated with MAC CE(s)

Figure 6:
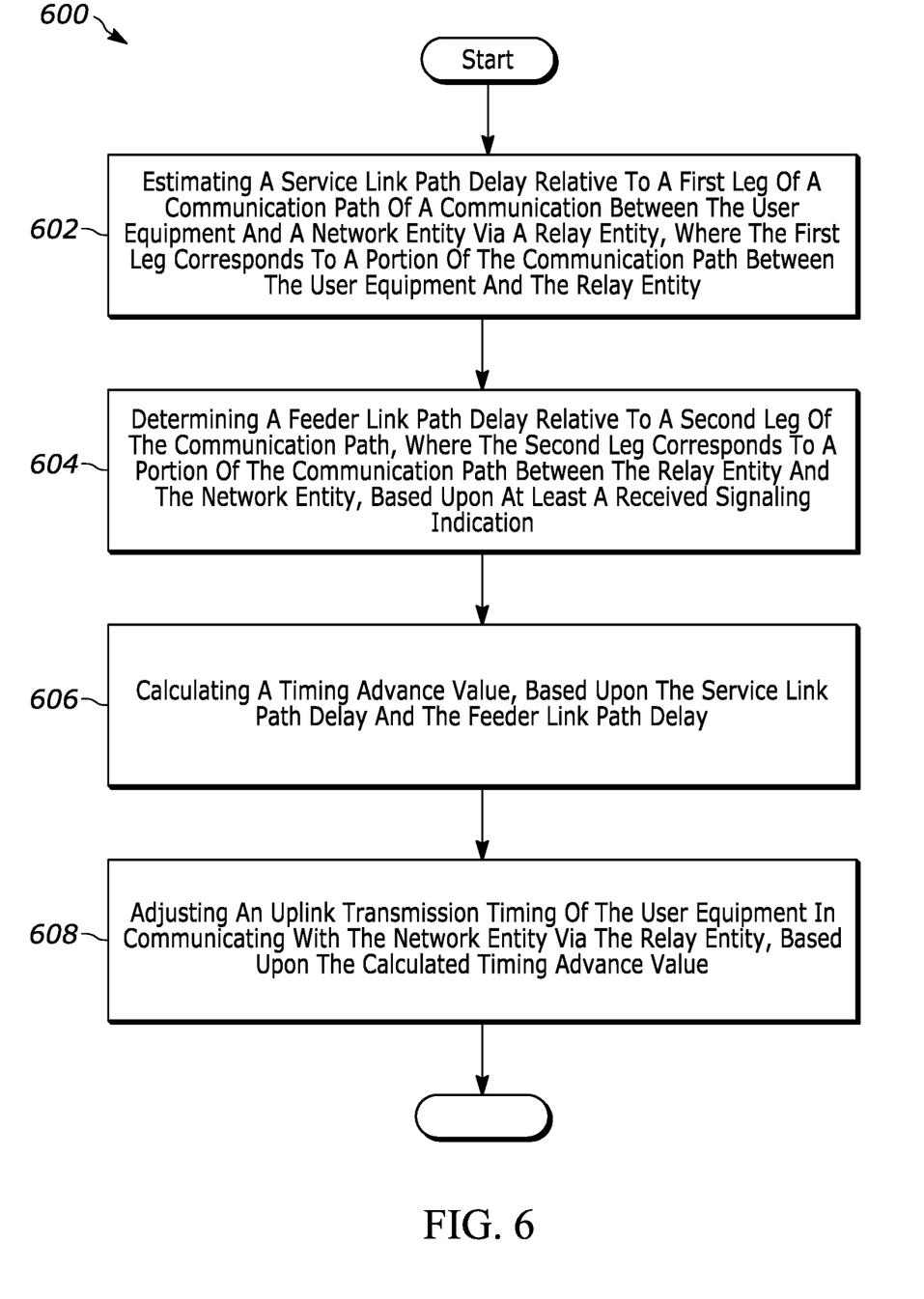
FIG. 6 is a flow diagram in a user equipment associated with a communication path including multiple legs involving a relay entity.

FIG. 6 illustrates a flow diagram 600 in a user equipment associated with a communication path including multiple legs involving a relay entity. In accordance with at least one embodiment, the method can include estimating 602 a service link path delay relative to a first leg of a communication path of a communication between the user equipment and a network entity via a relay entity, where the first leg corresponds to a portion of the communication path between the user equipment and the relay entity. A feeder link path delay relative to a second leg of the communication path can be determined 604, where the second leg corresponds to a portion of the communication path between the relay entity and the network entity, based upon at least a received signaling indication. A timing advance value can be calculated 606, based upon the service link path delay and the feeder link path delay. An uplink transmission timing of the user equipment in communicating with the network entity via the relay entity can be adjusted 608, based upon the calculated timing advance value.

In some instances, estimating the service link path delay relative to the first leg of the communication path can include determining a distance between an identified position of the user equipment and a position of the relay entity, and calculating the associated first leg path delay based upon an expected rate that a communication signal traverses an amount of space associated with the determined distance. In some of these instances, the position of the relay entity can be predicted by the user equipment based upon signaling information provided by the relay entity.

In some instances, the relay entity can be a space based satellite in orbit around the earth, where the space-based satellite has a relative movement that follows a predefined predictable pattern.

In some instances, where upon initially estimating the service link path delay relative to the first leg of the communication path, a first timer having a predetermined duration can be initiated, wherein upon expiration of the duration of the first timer, a new service link path delay can be estimated.

In some instances, determining the feeder link path delay relative to the second leg of the communication path can include receiving a signaling indication, based upon a calculated elapsed amount of time between a first point in time that a signal between the relay entity and the network entity can be transmitted, and a second point in time that a response to the transmitted signal can be received.

In some instances, where upon initially determining the feeder link path delay relative to the second leg of the communication path based upon at least the received signaling indication, a second timer having a predetermined duration can be initiated, wherein upon expiration of the duration of the second timer, the user equipment can request an update via a further received signaling indication. In some of these instances, the further received signaling indication can be triggered by a random access procedure. In some instances, the further received signaling indication can include a trigger to send system information for acquisition of the offset value associated with the feeder link path delay. In some instances, the received signaling indication can be a timing advance command indicating a relative timing difference. In some of these instances, the second timer can be restarted in response to receiving the timing advance command indicating a relative timing difference.

In some instances, the received signaling indication associated with determining a feeder link path delay can be received from the network entity.

In some instances, the timing advance value can be two times the sum of the service link path delay and the feeder link path delay.

Figure 7:
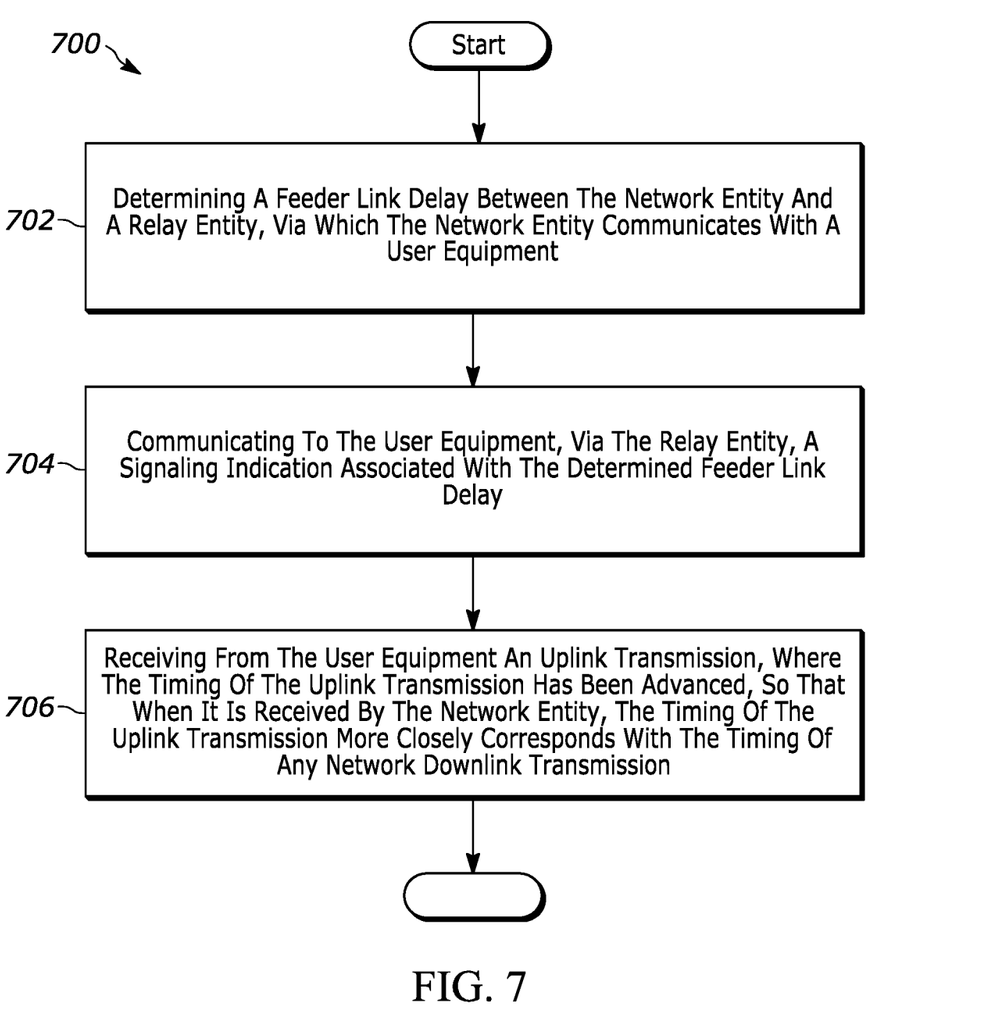
FIG. 7 is a flow diagram in a network entity associated with a communication path including multiple legs involving a relay entity.

FIG. 7 illustrates a flow diagram 700 in a network entity associated with a communication path including multiple legs involving a relay entity. In accordance with at least one embodiment, the method can include determining 702 a feeder link delay between the network entity and a relay entity, via which the network entity communicates with a user equipment. A signaling indication associated with the determined feeder link delay can be communicated 704 to the user equipment, via the relay entity. An uplink transmission can be received 706 from the user equipment, where the timing of the uplink transmission has been advanced, so that when it is received by the network entity, the timing of the uplink transmission can more closely correspond with the timing of any network downlink transmission.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, or other network entity, can perform reciprocal operations of a UE. For example, the network entity can transmit signals received by the UE and can receive signals transmitted by the UE. The network entity can also process and operate on sent and received signals.

Figure 8:
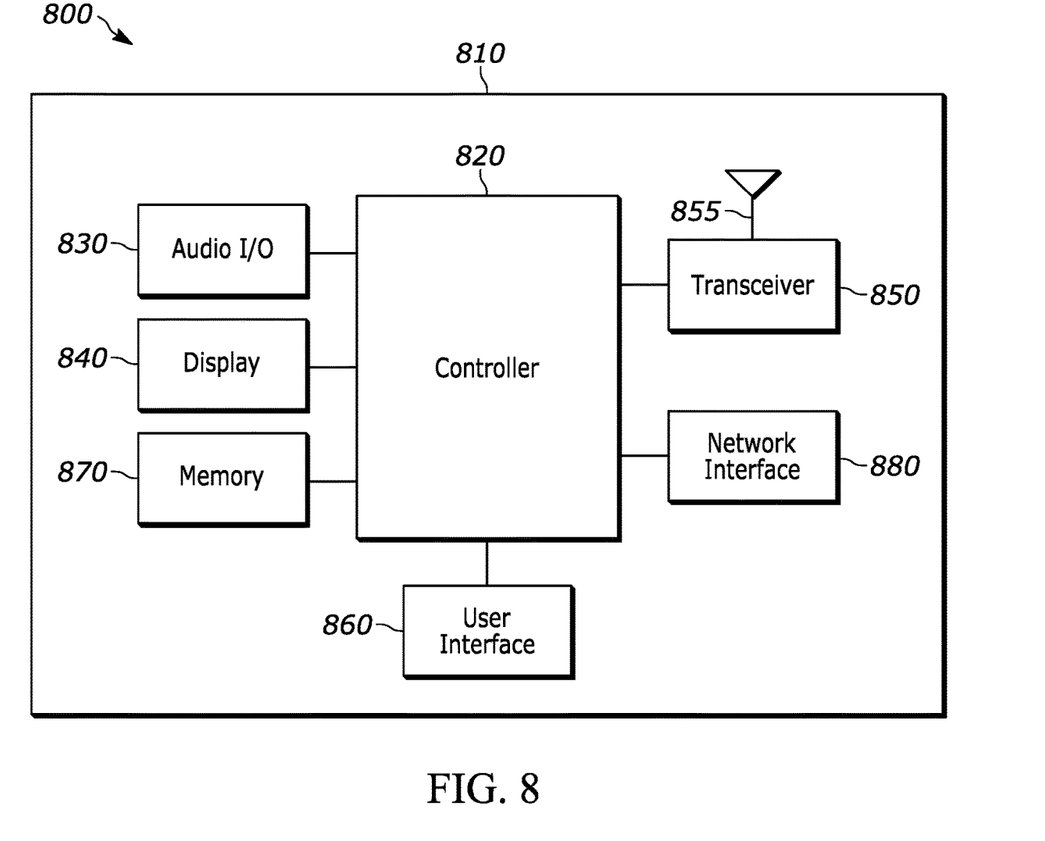
FIG. 8 is an example block diagram of an apparatus according to a possible embodiment.

FIG. 8 is an example block diagram of an apparatus 800, such as the wireless communication devices 110 and/or 112, according to a possible embodiment. The apparatus 800 can include a housing 810, a controller 820 within the housing 810, audio input and output circuitry 830 coupled to the controller 820, a display 840 coupled to the controller 820, a transceiver 850 coupled to the controller 820, an antenna 855 coupled to the transceiver 850, a user interface 860 coupled to the controller 820, a memory 870 coupled to the controller 820, and a network interface 880 coupled to the controller 820. The apparatus 800 can perform the methods described in all the embodiments.

The display 840 can be a viewfinder, a liquid crystal display (LCD), a light emitting diode (LED) display, a plasma display, a projection display, a touch screen, or any other device that displays information. The transceiver 850 can include a transmitter and/or a receiver. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 870 can include a random access memory, a read only memory, an optical memory, a solid state memory, a flash memory, a removable memory, a hard drive, a cache, or any other memory that can be coupled to an apparatus.

The apparatus 800 or the controller 820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 870 or elsewhere on the apparatus 800. The apparatus 800 or the controller 820 may also use hardware to implement disclosed operations. For example, the controller 820 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating an apparatus and implementing the disclosed embodiments. Some or all of the additional elements of the apparatus 800 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. Further, various components of the embodiments may be interchanged, added, or substituted in the other embodiments. Also, all of the elements of each figure are not necessary for operation of the disclosed embodiments. For example, the apparatus illustrated and described with respect to FIG. 8 is further relevant as a network entity and/or as a relay entity. In such an instance, the specific form and/or the need for any user interface 860, audio I/O 830 and/or display 840 may differ. One of ordinary skill in the art of the disclosed embodiments would be enabled to make and use the teachings of the disclosure by simply employing the elements of the independent claims.

Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A user equipment (UE) for wireless communication, comprising:
   at least one memory; and
   at least one processor coupled with the at least one memory and configured to cause the UE to:
      estimate a service link path delay relative to a first leg of a communication path of a communication between the UE and a network entity via a relay entity, wherein the first leg corresponds to a portion of the communication path between the user equipment and the relay entity;
      determine a feeder link path delay relative to a second leg of the communication path based at least in part on a signaling indication received from the network entity, wherein the second leg corresponds to a portion of the communication path between the relay entity and the network entity;
      calculate a timing advance value based on the service link path delay and the feeder link path delay, wherein the timing advance value is two times a sum of the service link path delay and the feeder link path delay; and
      adjust an uplink transmission timing of the UE communicating with the network entity via the relay entity based on the calculated timing advance value.

2. The UE of claim 1, wherein to estimate the service link path delay relative to the first leg of the communication path, the at least one processor is configured to cause the UE to determine a distance between an identified position of the UE and a position of the relay entity, and calculate the service link path delay based on an expected rate that a communication signal traverses an amount of space associated with the determined distance.

3. The UE of claim 2, wherein the at least one processor is configured to cause the UE to predict the position of the relay entity based on signaling information provided by the relay entity.

4. The UE of claim 1, wherein the relay entity is a space based satellite in orbit around Earth, wherein the space based satellite has a relative movement that follows a predefined predictable pattern.

5. The UE of claim 1, wherein the at least one processor is configured to cause the UE to:
   initiate a timer having a predetermined duration based on initially estimating the service link path delay relative to the first leg of the communication path; and
   estimate a new service link path delay based on expiration of the predetermined duration of the timer.

6. The UE of claim 1, wherein the determine the feeder link path delay relative to the second leg of the communication path is based on a calculated elapsed amount of time between a first point in time that a signal between the relay entity and the network entity is transmitted, and a second point in time that a response to the transmitted signal is received.

7. The UE of claim 1, wherein the at least one processor is configured to cause the UE to:
   initiate a timer having a predetermined duration based on initially determining the feeder link path delay relative to the second leg of the communication path based on at least the received signaling indication; and
   request an update as another received signaling indication based on expiration of the predetermined duration of the timer.

8. The UE of claim 7, wherein the another received signaling indication is triggered by a random access procedure.

9. The UE of claim 7, wherein the another received signaling indication includes a trigger to send system information for acquisition of an offset value associated with the feeder link path delay.

10. The UE of claim 7, wherein the received signaling indication is a timing advance command indicating a relative timing difference.

11. The UE of claim 10, wherein the timer is restarted in response to receiving the timing advance command indicating the relative timing difference.

12. A method performed by a user equipment (UE), the method comprising:
   estimating a service link path delay relative to a first leg of a communication path of a communication between the UE and a network entity via a relay entity, wherein the first leg corresponds to a portion of the communication path between the user equipment and the relay entity;
   determining a feeder link path delay relative to a second leg of the communication path based at least in part on a signaling indication received from the network entity, wherein the second leg corresponds to a portion of the communication path between the relay entity and the network entity;
   calculating a timing advance value based on the service link path delay and the feeder link path delay, wherein the timing advance value is two times a sum of the service link path delay and the feeder link path delay; and
   adjusting an uplink transmission timing of the UE communicating with the network entity via the relay entity based on the calculated timing advance value.

13. A network entity for wireless communication, comprising:
- at least one memory; and
- at least one processor coupled with the at least one memory and configured to cause the network entity to:
- determine a feeder link path delay of a feeder link path between the network entity and a relay entity, via which the network entity communicates with a user equipment (UE);
- transmit, to the UE via the relay entity, a signaling indication associated with the determined feeder link path delay; and
- receive, from the UE, an uplink transmission, wherein a timing of the uplink transmission has been advanced based on a timing advance value calculated based on the feeder link path delay and a service link path delay associated with a service link path between the UE and the relay entity, wherein the timing advance value is two times a sum of the service link path delay and the feeder link path delay, and wherein the timing of the uplink transmission corresponds with a timing of a network downlink transmission.

14. A method performed by a network entity, the method comprising:
- determining a feeder link path delay of a feeder link path between the network entity and a relay entity, via which the network entity communicates with a user equipment (UE);
- transmitting, to the UE via the relay entity, a signaling indication associated with the determined feeder link path delay; and
- receiving, from the UE, an uplink transmission, wherein a timing of the uplink transmission has been advanced based on a timing advance value calculated based on the feeder link path delay and a service link path delay associated with a service link path between the UE and the relay entity, wherein the timing advance value is two times a sum of the service link path delay and the feeder link path delay, and wherein the timing of the uplink transmission corresponds with a timing of a network downlink transmission.

15. The method of claim 12, wherein to estimate the service link path delay relative to the first leg of the communication path, the method further comprising:
- determining a distance between an identified position of the UE and a position of the relay entity, and calculating the service link path delay based on an expected rate that a communication signal traverses an amount of space associated with the determined distance.

16. The method of claim 15, further comprising:
- predicting the position of the relay entity based on signaling information provided by the relay entity.

17. The method of claim 12, wherein the relay entity is a space based satellite in orbit around Earth, where in the space based satellite has a relative movement that follows a predefined predictable pattern.

18. The method of claim 12, further comprising:
- initiating a timer having a predetermined duration based on initially estimating the service link path delay relative to the first leg of the communication path; and
- estimating a new service link path delay based on expiration of the predetermined duration of the timer.

19. The method of claim 12, wherein the determining the feeder link path delay relative to the second leg of the communication path is based on a calculated elapsed amount of time between a first point in time that a signal between the relay entity and the network entity is transmitted, and a second point in time that a response to the transmitted signal is received.

20. The method of claim 12, further comprising:
- initiating a timer having a predetermined duration based on initially determining the feeder link path delay relative to the second leg of the communication path based on at least the received signaling indication; and
- requesting an update as another received signaling indication based on expiration of the predetermined duration of the timer.

* * * * *